Patented May 27, 1941

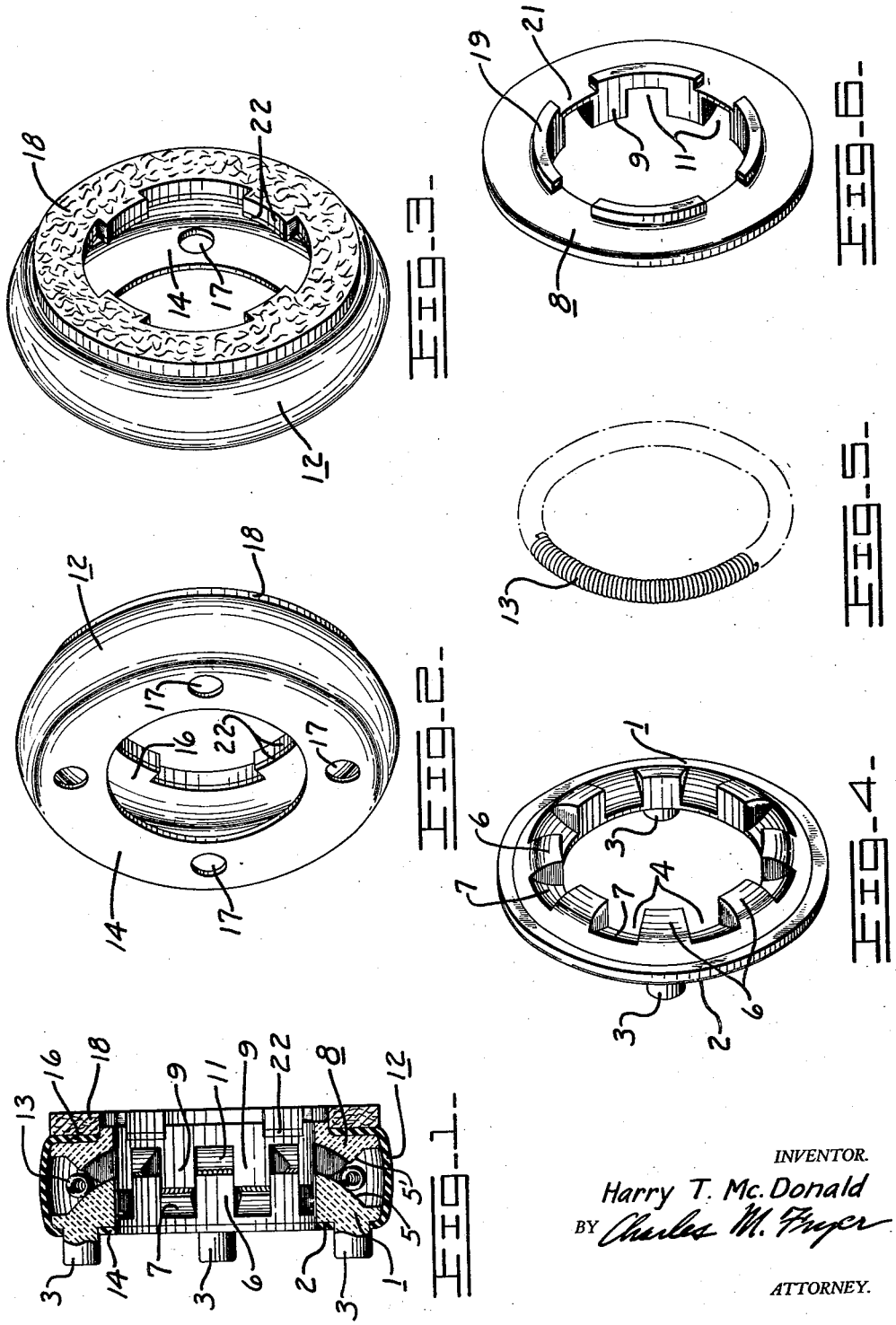

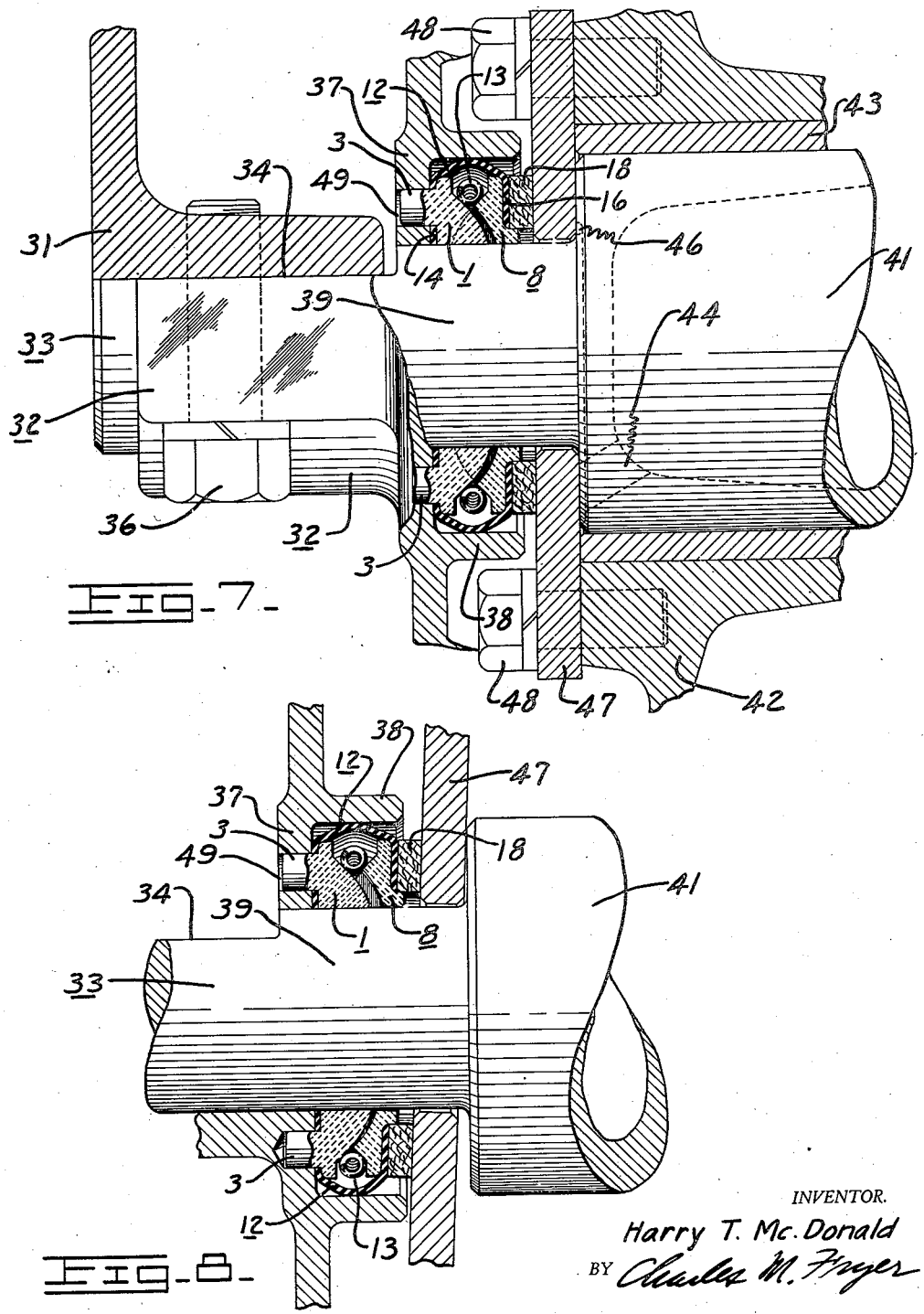

2,243,255

UNITED STATES PATENT OFFICE 2,243,255

SEAL

Harry T. McDonald, Peoria, Ill., assignor to Caterpillar Tractor Co., San Leandro, Calif., a corporation of California Application February 11, 1939, Serial No. 255,889

8 Claims. (Cl. 286—11)

My invention relates to seals, and more particularly to a seal structure between relatively movable parts, to preclude the ingress of foreign matter and escape of lubricant from one of such parts, which may be a bearing.

With respect to a machine such as a track-type tractor, where the machine is frequently operated in the presence of dirt, gravel and other abrasives, it is important that efficient sealing means be provided between vital operating parts. My invention is designed to satisfy the requirements of sealing means of this character, and has as its object, among others, the provision of an improved sealing device which is of comparatively small diameter and, therefore, can be positioned in a comparatively small space, and which is also economical to manufacture. Other objects of the invention will become apparent from a perusal of the following description thereof.

In general terms, the seal of my invention is made as a unitary article of manufacture, so as to be positionable as a unit at the desired location. It comprises two plate or ring parts, each of which is formed with tongues adapted to slide axially in recesses of the other part to thus provide an interlocking connection which prevents relative rotation between such parts. The parts are connected together by a flexible sleeve which encloses, and is secured to each of such parts against relative rotatable movement with respect thereto. Cooperating surfaces on such parts are curved and provide a support for a garter spring positioned between the parts, which acts to thrust such parts apart, but allow them to be compressed together. One of the parts is provided with pins adapted to be inserted in recesses in a stationary member to hold the entire structure against rotation; and associated with the other part is a packing ring adapted to frictionally engage and seal against a rotatable washer.

Reference is now made to the drawings for a more detailed description of the invention. In the drawings:

Fig. 1 is a vertical sectional view through the seal of my invention.

Fig. 2 is a perspective view of a flexible sleeve which connects certain of the parts of such seal.

Fig. 3 is a perspective view of such sleeve, looking at it from a different angle, and illustrating a packing ring attached thereto.

Fig. 4 is a perspective view of one of the ring parts of the seal.

Fig. 5 is a perspective view of a garter spring employed in the seal for thrusting certain of the parts thereof apart.

Fig. 6 is a perspective view of another of the ring parts employed in the device of my invention.

Fig. 7 is a transverse sectional view through a portion of a track roller mounting employed on a track-type tractor, and illustrates the seal in position.

Fig. 8 is a view somewhat similar to Fig. 7 illustrating, to an exaggerated degree, how the seal accommodates itself to misalinement of a member against which the seal is thrust.

With particular reference to Figs. 1 through 6, the seal comprises ring member 1 having an outer flat surface 2 from which project a plurality of equi-spaced pins 3. The inner side of such ring member is formed with an outward slant in the form of a convex surface 5; and a plurality of equi-spaced recesses 4 are formed in such inner side through the convex surface, leaving a plurality of similarly equi-spaced projecting tongues 6. Each of such recesses is formed with undercut concave surface 7, the curvature of all of which is complementary to a convex inner surface 5' on a second ring member 8 which is constructed with similar tongues 9 and recesses 11. Ring members 1 and 8 may be made of any suitable material, but for economy are preferably made of hard plastic such as any of the numerous phenol condensation products, or artificial resins.

A flexible annular member substantially U-shaped in cross section, in the form of sleeve 12 enclosing ring members 1 and 8, and a garter spring 13 positioned between the inner sides of such ring members and resting on the cooperating curved surfaces 5 and 5' thereof, are provided. Sleeve 12 is made of any suitable flexible material, preferably of synthetic rubber because such material has been found to be wear-resistant to the action of lubricating oil, and is formed with flat portions 14 and 16 at its ends; portion 14 having a plurality of apertures 17 into which pins 3 project to thus hold the sleeve 12 against rotational movement with respect to ring member 1. A packing ring 18 is secured to the outside surface of flat portion 16. Such securing may be accomplished by means of any suitable adhesive, but is preferably by vulcanization to such portion 16, thus providing an integral structure. Packing ring 18 may be of any suitable packing material, such as leather or a fabric-rubber composition. It is to be observed that the outer side or face of ring member 8 is formed with an outwardly projecting annular flange 19 which is formed with a plurality of equi-spaced recesses 21; and flat portion 16 of the sleeve 12 and also the packing ring 18 secured thereto, are formed with a plurality of tongues 22 which engage in the recesses 21 to thus preclude relative rotational movement between the sleeve and the ring member 8.

Sleeve member 12 is of such length as to preclude spring 13 from causing disengagement of the ring tongues 6 and 9 from the ring recesses 11 and 4 in which they respectively engage, to thus preclude relative rotational movement between the two ring parts 1 and 8 of the seal even in the fully extended position thereof, illustrated in Fig. 1. Such tongues, and recesses or notches thus provide interlocking means which hold the two ring parts 1 and 8 against relative rotational movement at all times, but permit relative axial and tilting movements therebetween. Garter spring 13 is of smaller diameter than the diameter of ring parts 1 and 8, and provides resilient means acting normally to thrust apart such ring members. At the same time, the spring permits relative axial movement between the ring members, and also tilting of one ring member with respect to the other when pressure causes the ring members to be compressed together against the action of the spring; the cooperating curved surfaces 5 and 5' providing a smooth support for the spring to allow it to slide easily thereover as it expands or contracts upon relative axial and tilting movements between the ring members.

As a result of these features, when the seal is placed in position and held against rotational movement by engagement of pins 3 in suitable recesses in a stationary member, and the packing ring 18 is in frictional engagement with a rotational sealing surface, spring 13 will insure sealing contact between the packing ring and the sealing surface. At the same time, since relative tilting movement can occur between the ring members 1 and 8, the frictional seal will be maintained irrespective of whether the sealing surface engaging packing ring 18 rotates in a true plane. Furthermore, since the sleeve 12 is held against rotation with respect to both the ring parts 1 and 8 which are also held against rotational movement with respect to each other, tearing of the seal is prevented, which might otherwise result from engagement of packing 18 against a rotating member.

Fig. 7 illustrates the seal when employed for sealing a form of track roller mounting of a track-type tractor, to preclude escape of lubricant and entrance of dirt. However, it is to be understood that the seal can be employed in any other environment presenting similar sealing problems. For example, when made larger, it may be used in environments such as those disclosed in my assignee's patents to Eberhard No. 1,972,078, dated September 4, 1934, and No. 2,008,901, dated July 23, 1935.

The track roller construction includes an endless track frame, a part 31 of which is illustrated in the drawings, to which is secured by bracket clamp 32 a stationary track roller shaft 33 having flat portion 34 which cooperates in holding the shaft against rotation; the bracket 32 being secured to the track frame 31 by suitable screws 36. Bracket 32 is formed with an integral flange portion 37 having an inwardly projecting annular flange 38 which provides a dirt shroud or protecting housing for the seal; and the shaft 33 includes reduced diameter portion 39 having a tight fit in flange 37 to prevent ingress of dirt at this point.

Journaled on enlarged diameter portion 41 of shaft 33 is a track roller 42; a suitable bearing sleeve or bushing 43 being provided. The bearing surfaces between the shaft and the roller are lubricated by means of lubricant passage 44 communicating with groove 46; the interior of shaft portion 41 being hollow so as to hold lubricant therein. Track roller 42 is formed with the customary flanged wheels (not shown) adapted to run over an endless track (not shown) and consequently rotates on the stationary shaft 33. To the end thereof adjacent the seal is secured a suitable washer plate 47 by means of cap screws 48; such washer plate being preferably of corrosive proof material, such as chromium plated metal which provides a smooth surface for frictional engagement with packing ring 18 of the seal. The distance between the inside surface of flange 37 and the outside surface of washer 47 is such that when the seal is positioned within shroud 38 with pins 3 engaged in suitable recesses 49 in flange 37, the two parts 1 and 8 will be compressed together to thus cause spring 13 to exert pressure so as to maintain packing ring 18 in frictional sealing engagement with the sealing surface of washer 47.

In operation, as the track roller 42 rotates, the frictional engagement of sealing ring 18 against washer 47 prevents escape of lubricant and also ingress of foreign matter between these parts; sleeve 12 precludes escape of lubricant and ingress of dirt in back of packing ring 18; and the flat portion 14 of the sleeve being compressed against flange 37 provides a seal at that point. Thus, no lubricant can escape from or foreign matter enter the track roller bearing. The diameter of the central aperture in ring parts 1 and 8 is such as to provide a relatively close fit about the stationary shaft portion 39 and still allow relative tilting movement between such parts 1 and 8. The entire seal is held against rotation by means of the pins 3, and as was previously mentioned relative rotation is precluded between parts 1 and 8 by virtue of the interlocking means formed by the tongues and the recesses in such parts. Also, sleeve 12 can not have rotational movement with respect to either of parts 1 and 8 by virtue of engagement of pins 3 in apertures 17, and engagement of tongues 22 in recesses 21. As a result of this arrangement, rotation of washer 47 against packing ring 18 can not result in tearing or breaking of the seal.

In environments of the nature under discussion, it is not infrequent, as wear occurs, for parts to have rotation out of a true plane. As previously stated, the seal accommodates itself to this as is illustrated in Fig. 8, wherein washer 47 is shown angularly displaced to an exaggerated degree. It is to be noted from Fig. 8 that under such circumstances, relative tilting can occur between the ring members 1 and 8, which results in the entire sealing surface of the packing ring 18 being maintained against the sealing washer 47 at all times.

All the views illustrate the seal substantially to full scale, from which it can be seen that the described arrangement provides a very simple and compact one to fulfill the objects of my invention. However, as previously stated, the seal may be made larger if so desired, or even smaller, and employed in other environments than that described.

I, therefore, claim as my invention:

1. A seal structure comprising ring members having interlocking tongues and recesses precluding relative rotation therebetween but allowing relative axial movement, the adjacent surfaces of said tongues being inclined with respect to the axis of said members, a garter spring slidable over said inclined surfaces of said tongues between said members serving to thrust them apart, and a flexible sleeve secured to said members against relative rotation with respect thereto.

2. A seal structure comprising ring members having interlocking tongues and recesses precluding relative rotation therebetween but allowing relative axial and tilting movements, the adjacent surfaces of said tongues being inclined with respect to the axis of said members, a garter spring slidable over said inclined surfaces of said tongues between said members serving to urge them apart, a flexible sleeve enclosing said members and said spring and secured to said members against relative rotation with respect thereto, and a packing element associated with one of said members.

3. A seal structure comprising ring members having interlocking tongues and recesses precluding relative rotation therebetween but allowing relative axial and tilting movements, the adjacent surfaces of said tongues being inclined with respect to the axis of said members, a garter spring slidable over said inclined surfaces of said tongues between said members serving to urge them apart, a flexible sleeve enclosing said members and said spring and secured to said members against relative rotation with respect thereto, a packing element associated with one of said members, and means associated with the other of said members adapted for engaging a stationary member to hold the entire seal structure against rotation.

4. A seal structure comprising ring members having interlocking tongues and recesses precluding relative rotation therebetween but allowing relative axial and tilting movements, the adjacent surfaces of said tongues being inclined with respect to the axis of said members, a garter spring slidable over said inclined surfaces of said tongues between said members serving to urge them apart, the adjacent surfaces of said members being curved to allow said spring to slide easily thereover, a flexible sleeve enclosing said members and said spring and attached to said members against relative rotation with respect thereto, a packing element associated with one of said members, and pins projecting from the other member adapted for engaging recesses in a stationary member to hold the entire seal structure against rotation.

5. A seal structure located between a rotatable element and a stationary element comprising ring members having interlocking tongues and recesses precluding relative rotation therebetween, the adjacent surfaces of said tongues being inclined with respect to the axis of said members, a garter spring slidable over said inclined surfaces of said tongues between said members thrusting them apart, a flexible sleeve about said members and said spring and attached to said members against relative rotation with respect thereto, a packing associated with one of said members and frictionally engaging said rotatable element, and means associated with the other member engaging the stationary element to hold the entire seal structure against rotation; and shroud means on said stationary element housing said structure.

6. A seal structure comprising cooperating ring members having their adjacent inner sides formed with outwardly slanting surfaces through which extend a plurality of recesses providing a plurality of projecting tongues interlocking said recesses to preclude relative rotation between said members but allowing relative axial and tilting movements, the adjacent surfaces of said tongues slanting outwardly, and a garter spring between said members serving to urge them apart and slidable over said outwardly slanting tongue surfaces.

7. A seal structure comprising cooperating ring members having their adjacent inner sides formed with outwardly slanting surfaces through which extend a plurality of recesses providing a plurality of projecting tongues interlocking said recesses to preclude relative rotation between said members but allowing relative axial and tilting movements, the adjacent surfaces of said tongues slanting outwardly, a garter spring between said members serving to urge them apart and slidable over said outwardly slanting tongue surfaces, and a flexible sleeve enclosing said members and said spring and attached to said members against relative rotation with respect thereto.

8. A compact seal structure comprising closely positioned ring members having their adjacent inner sides formed with outwardly slanting convex surfaces through which extend a plurality of recesses providing a plurality of projecting tongues interlocking said recesses to preclude relative rotation between said members but allowing relative axial and tilting movements, the adjacent surfaces of said tongues being convex and slanting outwardly, a garter spring between said members serving to urge them apart and slidable over said outwardly slanting convex tongue surfaces, pins integral with and projecting from the outer side of one of said members for engaging recesses in a stationary member to hold the entire seal structure against rotation, a flexible sleeve substantially U-shaped in cross section enclosing said members and said spring and having flat end portions engaging the outer sides of said members, one of said flat portions having apertures therein through which said pins extend to preclude relative rotation between said one member and the sleeve, and means on the other side of the other of said members engaging the other of said flat portions for precluding relative rotation between said sleeve and said other member.

HARRY T. McDONALD.

CERTIFICATE OF CORRECTION.

Patent No. 2,243,255.　　　　　　　　　　　　　　　　May 27, 1941.

HARRY T. McDONALD.

It is hereby certified that error appears in the printed specification of the above numbered patent requiring correction as follows: Page 3, second column, line 63, claim 8, for the words "other side" read --outer side--; and that the said Letters Patent should be read with this correction therein that the same may conform to the record of the case in the Patent Office.

Signed and sealed this 1st day of July, A. D. 1941.

(Seal)　　　　　　　　　　　　　　　　　　　　　Henry Van Arsdale,
　　　　　　　　　　　　　　　　　　　　Acting Commissioner of Patents.